(12) United States Patent
Kuta

(10) Patent No.: US 7,404,988 B2
(45) Date of Patent: Jul. 29, 2008

(54) HEADLIGHT LENS RESURFACING APPARATUS AND METHOD

(76) Inventor: Terry Mitchell Kuta, 27412 La Cabra, Mission Viejo, CA (US) 92691

( * ) Notice: Subject to any disclaimer, the term of this patent is extended or adjusted under 35 U.S.C. 154(b) by 776 days.

(21) Appl. No.: 10/804,435

(22) Filed: Mar. 18, 2004

(65) Prior Publication Data

US 2005/0208210 A1 Sep. 22, 2005

(51) Int. Cl.
B05D 3/06 (2006.01)
B05D 3/12 (2006.01)
B05D 3/10 (2006.01)
G02B 1/12 (2006.01)
B24B 1/04 (2006.01)

(52) U.S. Cl. .................. 427/508; 427/512; 427/162; 427/163.1; 427/307; 427/322; 427/140; 216/53; 451/54

(58) Field of Classification Search .................. None
See application file for complete search history.

(56) References Cited

U.S. PATENT DOCUMENTS

| 4,288,233 | A | * | 9/1981 | Wiand | 51/295 |
|---|---|---|---|---|---|
| 4,301,193 | A | * | 11/1981 | Zuk | 427/140 |
| 5,104,421 | A | * | 4/1992 | Takizawa et al. | 51/295 |
| 5,194,293 | A | * | 3/1993 | Foster | 427/512 |
| 5,443,604 | A | * | 8/1995 | Stowell | 51/307 |
| 5,632,668 | A | * | 5/1997 | Lindholm et al. | 451/42 |
| 5,913,716 | A | * | 6/1999 | Mucci et al. | 451/59 |
| 6,089,963 | A | * | 7/2000 | Wiand et al. | 451/390 |
| 6,423,381 | B1 | * | 7/2002 | Colton et al. | 427/510 |
| 6,984,612 | B2 | * | 1/2006 | Maillie | 510/163 |
| 7,045,001 | B1 | * | 5/2006 | Kropp et al. | 106/3 |
| 7,163,446 | B1 | * | 1/2007 | Cole et al. | 451/54 |
| 7,297,364 | B2 | * | 11/2007 | Krause-Heringer et al. | 427/140 |
| 2002/0061723 | A1 | * | 5/2002 | Duescher | 451/527 |
| 2002/0071957 | A1 | * | 6/2002 | Squitieri | 428/442 |
| 2004/0043710 | A1 | * | 3/2004 | Miyazawa | 451/42 |
| 2004/0157758 | A1 | * | 8/2004 | Adickes et al. | 510/180 |
| 2007/0141242 | A1 | * | 6/2007 | Krause-Heringer et al. | 427/140 |

OTHER PUBLICATIONS

Neil Ellis, Extra Info: Info Tips and Tricks for Shellawax & Shellawax Cream, U-Beaut Enterprises (5 pages), Mar. 2003.*

* cited by examiner

Primary Examiner—Marianne L Padgett
(74) Attorney, Agent, or Firm—Gene Scott; Patent Law & Venture Group

(57) ABSTRACT

Refinishing an exterior automotive lens having a damaged exterior surface in situ using a continuous movement and oscillating motion, with first, a 320 grit sanding disc, next a 600 grit sanding disc and finally a 1500 grit sanding pad while flushing the surface with water to prevent melting of the surface. Buffing the surface with a polishing compound until a high gloss is achieved. Finally, coating the surface with a transparent ultraviolet hardenable coating material, and hardening it by exposure to an ultraviolet light source. This method is accomplished using an oscillating tool having a remotely located drive.

2 Claims, 3 Drawing Sheets

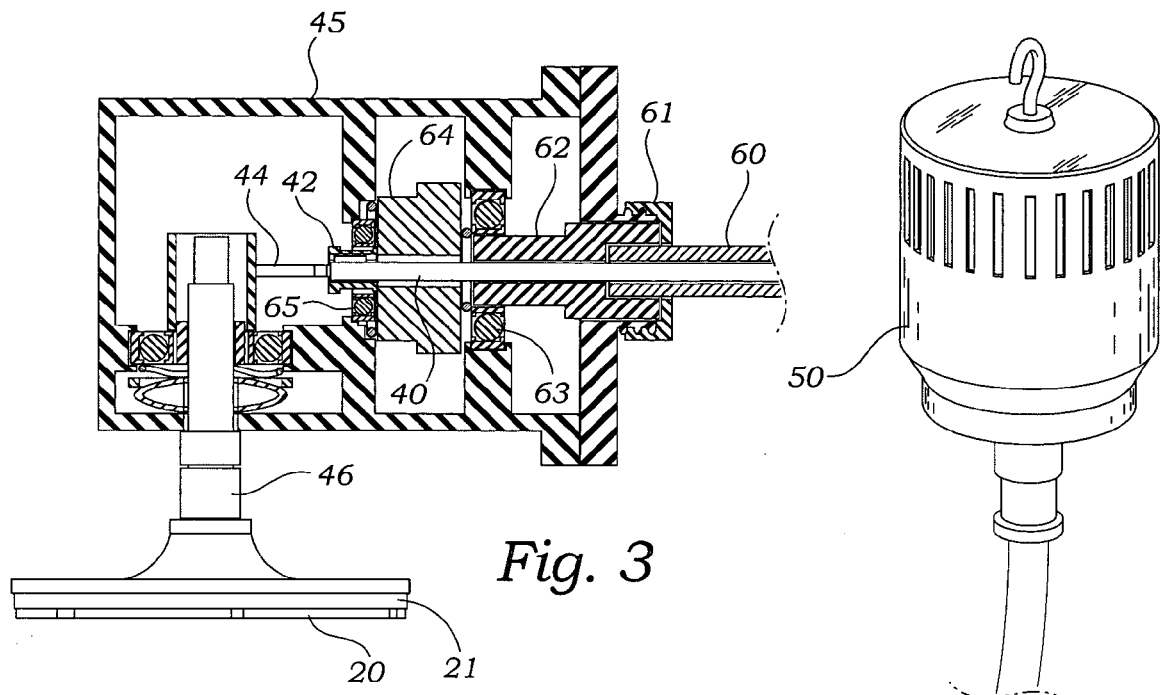
Fig. 3
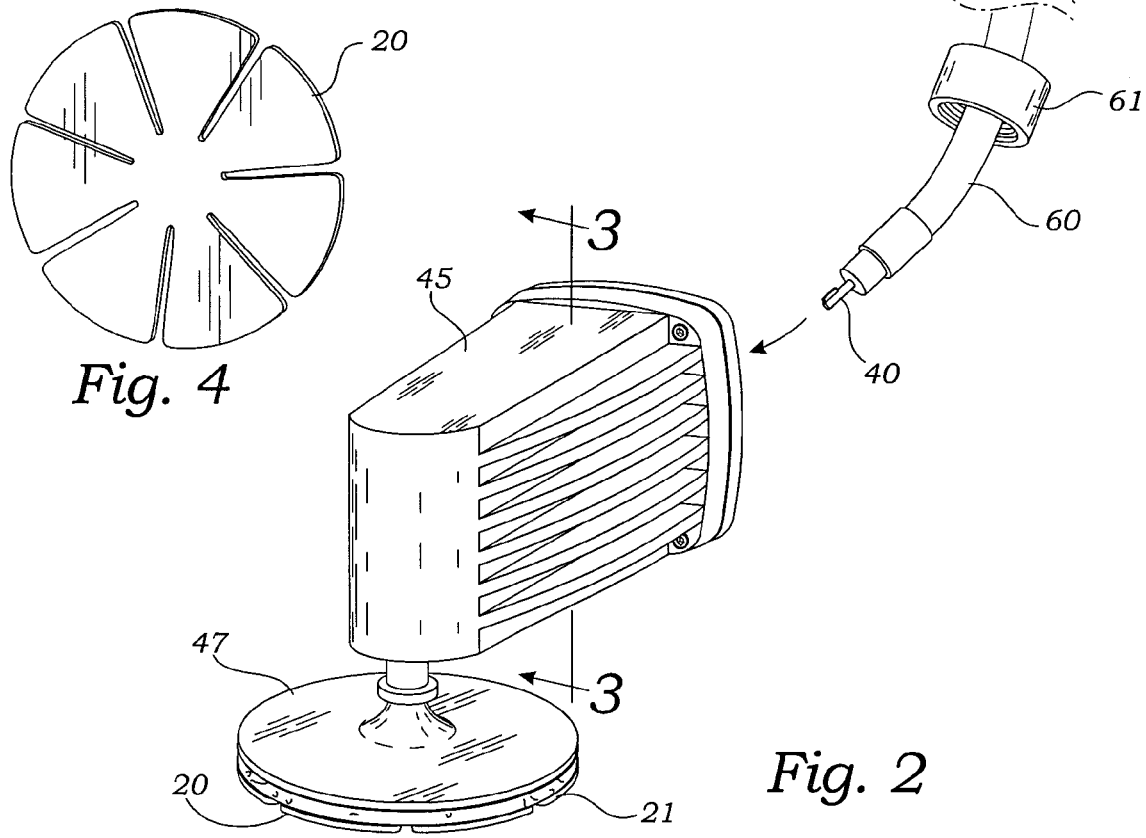
Fig. 4
Fig. 2

HEADLIGHT LENS RESURFACING APPARATUS AND METHOD

BACKGROUND OF THE INVENTION

Incorporation by Reference

Applicant(s) hereby incorporate herein by reference, any and all U.S. patents and U.S. patent applications cited or referred to in this application.

Field of the Invention

This invention relates generally to resurfacing of transparent plastic surfaces due to wear and crazing, and more particular to a specific apparatus singly adapted for such resurfacing and a method of using the apparatus.

Description of Related Art

The following art defines the present state of this field:

Coburn, et al., U.S. Pat. No. 5,027,560 teaches a machine for finishing the surface of a lens including a lap holder moved orbitally in a first plane, a lens arm support having a lens holder, the lens arm support being oscillated in a second plane perpendicular to the first plane, the lens arm holder being also simultaneously oscillated in a third plane perpendicular to the first plane, the lens holder being urged toward the lap holder.

Sherwin, U.S. Pat. No. 4,510,717 teaches an apparatus for finishing or polishing a surface of a lens with a finishing tool. The apparatus includes a main frame, a shaft pivotally mounted to the main frame, and eccentric drive means driving the shaft in a predetermined orbital motion. Lens finishing means are fixedly secured to one end of the shaft. A lens carrier is slidably mounted to the main frame such as to be reciprocable along a path perpendicular to the orbital axis of the shaft. The lens is removably mounted to the carrier and is biased by a biasing device against the lens finishing tool.

Gulati, et al. U.S. Pat. No. 4,287,018 teaches a method and apparatus for edge-grinding stressed laminated glass-plastic lens blanks wherein the lens blanks are heated during the abrasive edging process to reduce thermal stress breakage. The edged lenses are optionally etched to remove glass flaws, thus providing laminated lenses exhibiting improved resistance to thermal stress breakage in use.

Our prior art search with abstracts described above teaches: a machine for finishing the surface of a lens, a lens finishing apparatus, and a method for finishing glass-plastic laminated lens blanks, but does not teach a machine for refinishing a damage lens surface using oscillating motion with a power drive remote with respect to an oscillating head and does not teach the present method of removal of the outer surface of the lens. The present invention fulfills these needs and provides further related advantages as described in the following summary.

SUMMARY OF THE INVENTION

The present invention teaches certain benefits in construction and use which give rise to the objectives described below.

Automobile headlamp lenses are generally fabricated by injection molding of engineering plastics such as polycarbonate. The General Electric Company sells polycarbonate resin under the well known name; Lexan®. Such lenses are quite clear, tough and chemical resistant, but suffer from surface crazing due to scratches that cause them to become cloudy over time, primarily through normal mechanical abrasion in use. The conventional remedy, when the lens becomes so cloudy that headlamp light is dangerously reduced, is to replace the lens. However, this is expensive because of the cost of new lenses and also because of the high hourly pay rate for mechanics that remove the worn lenses and replace them with new ones.

The present invention teaches an alternative to replacement that is more cost effective, in that it does not require removal of worn lenses nor mounting of new ones. Thus, this approach saves both the cost of new lenses as well as the cost of labor for replacement. The present invention teaches an apparatus that is ideally suited to removing the outer damaged surface of on an existing lens and a method for doing so. Therefore, the present invention method removes the abraded surface on a lens while it is still mounted on the vehicle, and restores optical clarity and light output to the level of new lenses.

The present invention teaches the refinishing of an exterior automotive lens having a damaged exterior surface in situ using a continuous movement and oscillating motion, with first, a 320 grit sanding disc, next a 600 grit sanding disc and finally a 1500 grit sanding disc while flushing the surface with water to prevent melting of the surface. This is followed by buffing the surface with a polishing compound until a high gloss is achieved. Finally, the surface is coating with a transparent ultraviolet hardenable coating material, which is then hardened by exposure to an ultraviolet light source. This method is accomplished using an oscillating tool having a remotely located drive so as to avoid mixing an electric drive with the water used for flushing the operation.

A primary objective of the present invention is to provide an apparatus and method of use of such apparatus that yields advantages not taught by the prior art.

Another objective is to provide such an invention capable of removing damage surfaces on automobile headlight lenses.

A further objective is to provide such an invention capable of being used in a water flooded surface refinishing operation without fear of electric shock.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 2 is a perspective view of a sanding apparatus thereof;

FIG. 3 is a cross sectional view of a portion of the sanding apparatus as taken along section line 3-3 in FIG. 2;

FIG. 4 is a perspective view of a sanding disc of the present invention.

DETAILED DESCRIPTION OF THE INVENTION

The above described drawing figures illustrate the invention in at least one of its preferred embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

Figure 1:
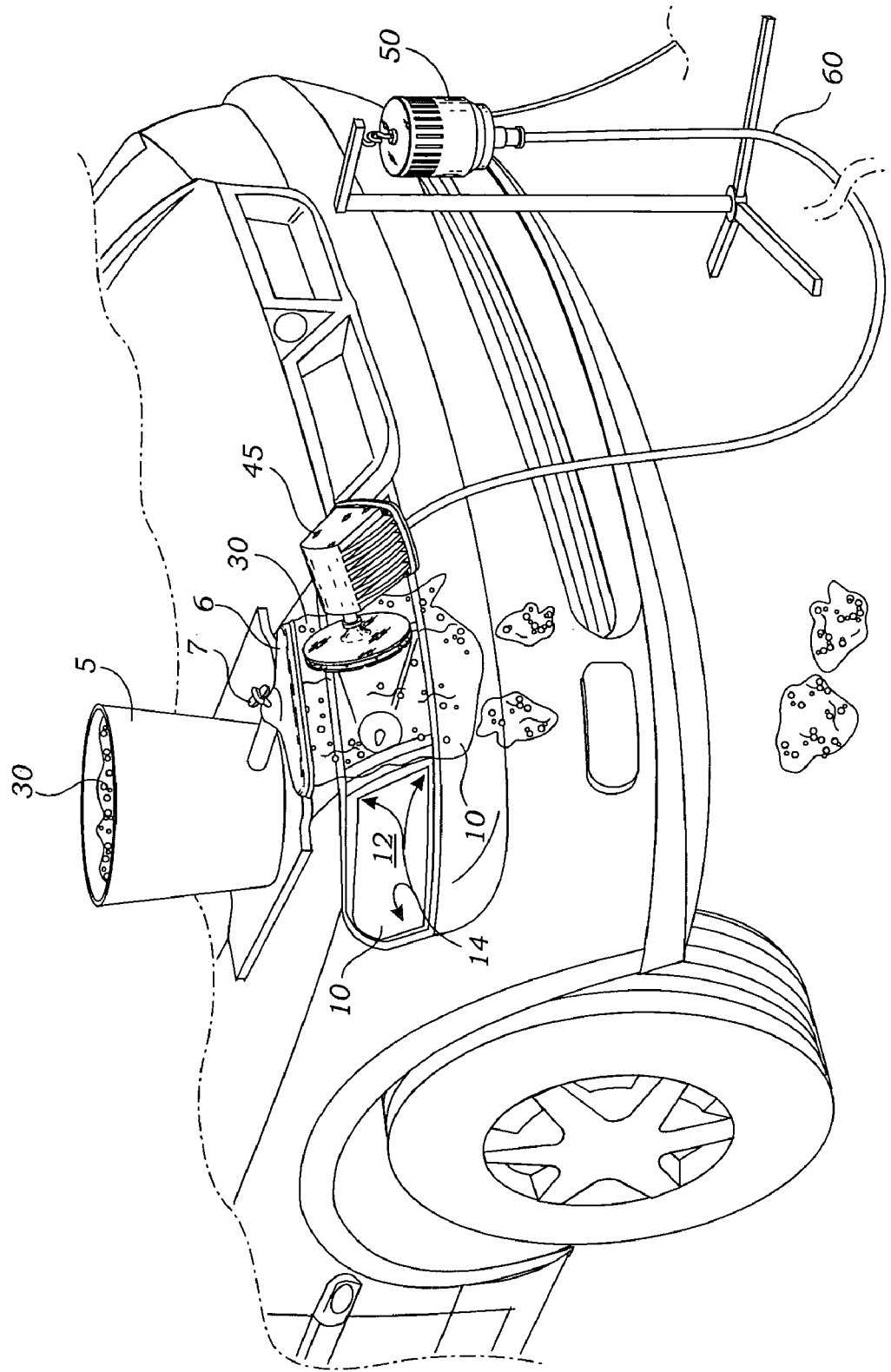
FIG. 1 is a perspective view of the invention showing its method of use.

The present invention is an apparatus and method for refinishing the outer surface of automotive lenses 10 in situ, that is, without removing them from the automobile, as shown in FIG. 1. The lenses 10 have a damaged exterior surface 12, primarily crazing of the surface, caused by the impact of stones and sand in the roadway, ultra-violet damage from the Sun and chemical damage from the environment, including acid rain, roadway chemicals and similar mechanical and chemical damage as well as the natural aging of hard coatings placed on such lenses at the factory. The method is a step-by-step process for removing this damage, to return the lenses 10 to like-new condition without the relatively high cost of replacing them. First, a fine sanding disc 20, of the type shown in FIG. 4, of approximately 320 grit, is placed into contact with one of the lenses and moved continuously, over the exterior surface 12 while applying an oscillating motion to the disc 20 and while flushing the exterior surface 12 with water 30 to prevent the exterior surface 12 from melting due to friction heat buildup from the sanding. As the exterior surface 12, primarily factory installed hard coating materials, of the lens 10 is removed it exposes a non-abraded surface below, which now becomes the exterior surface 12. The sanding process is stopped when the flushing water 30 turns clear. This same motion is repeated using an ultra-fine, 600 grit sanding disc 20 and, again, with the water flush, and stopping the sanding when the lens 10 appears clear. Finally, an ultra-ultra fine 1500 grit sanding pad is moved manually and continuously over the exterior surface 12 of the automotive lens 10 until limited access corners 14 of the lens 10, where the sanding disc 20 is unable to reach, become clear and, again, while flushing the exterior surface 12 with water 30 as before. When the lens 10 is satisfactory and quite clear, it is buffed using a buffing compound until a high gloss is achieved. Finally, the exterior surface 12 is coated with a transparent ultraviolet hardenable coating material, which is then hardened by exposure to an ultraviolet light source.

Preferably, the sanding action is achieved by a rotating shaft 40 driven by an AC motor 50. The shaft 40 has an eccentric disk 42 at one end which pushes an oscillating cage 44 back and forth, and through a linkage 46, causes the sanding disk 20, mounted on a disk receiver 47, to rotate about 45-60 degrees, first clockwise off center, then back to center, and then 60 degrees counterclockwise, i.e., a rotational back and forth oscillation. This type of motion has been found to be critical to the present method because, coupled with the manual movement of the sanding disc 20 is has been found to produce the least amount of spot heating of the surface. As mentioned above, because polycarbonate melts at a relatively low temperature, the sanding discs are constantly moved over the surface of the lens and the water flush must be continuous. The sanding disc 20 is preferably a round, three-inch diameter disc with radial relief slots as shown in FIG. 4. It is self adhesive so as to mount onto a one-eighth inch thick soft foam pad 21, which is itself adhesive mounted onto the flexible rubber sanding disk receiver 47 engaged with the linkage 46 from an oscillator device 45 as shown in cross-section in FIG. 3.

Preferably, the first abrasion step uses a fine (320 grit) sanding disc 20 by Cerium Optical Products of Kent, England. It is a 3", 7 leaf disc #PTF767. The first abrasion step primarily removes a scratch resistant coating applied by the lens manufacturer. The second abrasion step uses an extra fine (600 grit) sanding disc 20, also by Cerium Optical Products #PPF767. This step is stopped when clarity is restored to the lens which takes about 10 minutes. The third abrasion step uses an ultra fine (1500 grit) manual surfacing material to get into corners 14 missed by the prior steps. This step takes about 5 minutes, and is used mostly in corners 14 which are blended into the entire surface 12 of lens 10. The lens 10 is next buffed with a Canton flannel buffing wheel coated with Premium Buffing Compound produced by Dico Products Corporation of Utica, N.Y. The buffing uses continuous circular motion at between 2800 and 3200 rpm for approximately 10 to 15 minutes or until a high gloss is achieved. Finally, the new surface is polished. The oscillator 45 is used for the polishing operation. Constant movement of oscillator over the lens is used to prevent heat buildup at any one point on the lens surface 12. A self adhesive polishing pad is applied to receiver 47. A polish, preferably Americal Plus #714Y from Transelco Div. of Ferro Corporation, Dresden, N.Y. with 1.1 micron particles is used. This polish is applied liberally to the lens surface 12 and to a polishing pad using an atomizer. It is a high purity aluminum oxide polishing compound with low viscosity. A final polish is applied using a napped poromeric pad by Cerium Optical Products, configured as a 3", 6 leaf pad #PTY76. This final polishing is continued until all fine scratches are removed.

After preparing the lens 10, preferably, a scratch resistant coating is applied. This is a UV curable coating for hard overcoating onto polished lens, and preferably is, Tomco Finishing Products, Tomco Armor Coat No-Bake Scratch Coat.

The apparatus, as shown in FIGS. 1-5 comprises a motor 50, preferably an 115 volt AC operated motor, or a 12 volt DC operated motor that may be powered using a 12 volt battery. The motor is separated from the oscillator device 45 by a flexible drive shaft so that water is unlikely to be sprayed into the motor 50. It is considered critical to separate the motor 50 from the sanding oscillator or oscillator device 45.

Figure 5:
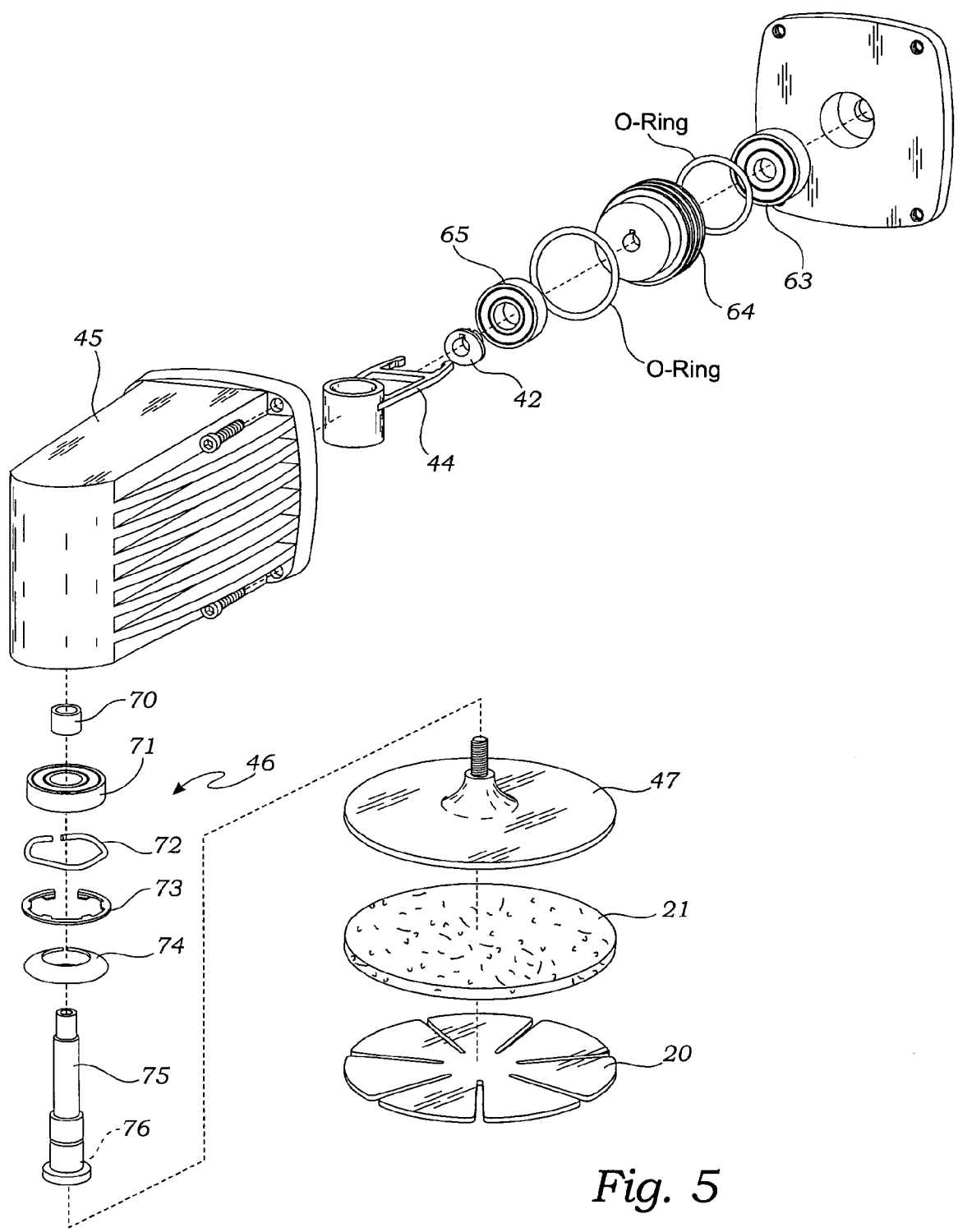
FIG. 5 is an exploded perspective view of a portion of the apparatus shown in FIG. 2.

The flexible cable includes outer sheath 60 and threaded cap 61 (FIG. 2). Oscillator device 45 includes cable receiver 62, first bearing set 63, bearing block 64 and second bearing set 65, all assembled and engaged in the housing shown in FIG. 3. As shown in FIG. 5, linkage 46 includes bushing 70, third bearing set 71, spring 72, lock-ring 73, rubber isolator 74 and spindle 75. Spindle 75 provides a female thread 76 for receiving the threaded stud 48 of disc receiver 47. Foam pad 21 provides compliant resilience for sanding disc 20, and this is critical for smoothing lens 10. It is considered within the capability of one of skill in the art to make and use the apparatus of this invention from the foregoing description and drawing figures.

As shown in FIG. 1, the water flush for refinishing in situ lenses may comprise a bucket 5 with a broad faced nozzle 6 and with a spigot 7 for adjustment of water flow. Other means for delivering a continuous flow of water to the lens surface 12 will be known by those of skill in the art.

The enablements described in detail above are considered novel over the prior art of record and are considered critical to the operation of the instant invention and to the achievement of the above described objectives. The words used in this specification to describe the invention and its various embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of this described invention and its various embodiments are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A refinishing method comprising the steps, taken in the following sequence, of:
   a) sanding an exterior surface of abraded plastic headlight lens on an automobile with an approximately 320 grit sanding disc engaged with an oscillator device having a rotational oscillating motion of between 45 and 60 degrees, the oscillator device moved continuously over the exterior surface while flushing the exterior surface with water, and halting the sanding when the exterior surface appears non-abraded and the flushing water appears clear;
   b) sanding the exterior surface with an approximately 600 grit sanding disc engaged with the oscillator device, the oscillator device moved continuously over the exterior surface while flushing the exterior surface with water, and halting the sanding when the exterior surface appears clear;
   c) sanding limited access corners of the exterior surface manually with an approximately 1500 grit sanding pad until the corners appear clear while flushing the exterior surface with water;
   d) buffing the exterior surface for at least 10 minutes using a flannel buffing wheel coated with a buffing compound, the buffing wheel providing continuous rotational motion of between 2800 and 3200 rpm;
   e) applying an aluminum oxide polishing compound having an approximately 1.1 micron particle size, using an atomizer, to a polishing pad and to the exterior surface;
   f) polishing the exterior surface using the polishing pad and the oscillator device moved continuously over the exterior surface;
   g) coating the exterior surface with an ultraviolet-hardenable transparent material; and
   h) exposing the transparent material to an ultraviolet light source thereby hardening the transparent material.

2. The method of claim 1 further comprising a final polishing step conducted after step (f), using a napped poromeric pad and continued until all visible fine scratches are removed from the exterior surface.

* * * * *